(12) United States Patent  (10) Patent No.: US 8,779,615 B2
Arlitt et al.  (45) Date of Patent:  Jul. 15, 2014

(54) MARITIME CURRENT POWER PLANT PARK AND A METHOD FOR ITS PRODUCTION

(75) Inventors: Raphael Arlitt, Ulm (DE); Frank Biskup, Schwabisch Gmund (DE); Norman Perner, Neu-Ulm (DE)

(73) Assignee: Voith Patent GmbH, Heidenheim (DE)

(*) Notice: Subject to any disclaimer, the term of this patent is extended or adjusted under 35 U.S.C. 154(b) by 177 days.

(21) Appl. No.: 13/461,208

(22) Filed: May 1, 2012

(65) Prior Publication Data

US 2012/0286518 A1  Nov. 15, 2012

(30) Foreign Application Priority Data

May 12, 2011  (DE) .......................... 10 2011 101 365

(51) Int. Cl.
| | |
|---|---|
| *F03B 13/00* | (2006.01) |
| *H02P 9/04* | (2006.01) |
| *F03B 13/10* | (2006.01) |
| *F03B 13/26* | (2006.01) |
| *F03B 17/06* | (2006.01) |
| *F03D 7/04* | (2006.01) |

(52) U.S. Cl.
CPC .............. *F03B 13/10* (2013.01); *F03B 13/264* (2013.01); *F05B 2240/97* (2013.01); *Y02E 10/28* (2013.01); *Y02E 10/22* (2013.01); *F03B 17/061* (2013.01); *Y02E 10/223* (2013.01); *F05B 2240/40* (2013.01); *F03D 7/048* (2013.01); *Y02E 10/763* (2013.01)
USPC ......................................................... 290/54

(58) Field of Classification Search
CPC ...... F03B 13/264; F03B 13/10; F03B 17/061;
F03B 2240/40; F05B 2230/502; F05B 2240/97; F05B 2230/601; Y02E 10/28; Y02E 10/22; Y02E 10/223; Y02E 10/763; B23P 17/00; F03D 7/048
USPC .......................... 290/54, 42, 43, 53; 29/592.1
See application file for complete search history.

(56) References Cited

U.S. PATENT DOCUMENTS 8,193,656 B2 * 6/2012 Che .................................. 290/54
2012/0056424 A1  3/2012 Holstein

FOREIGN PATENT DOCUMENTS

| CA | 2 647 773 | 6/2010 |
|---|---|---|
| DE | 10 2006 044 332 B3 * | 1/2008 |
| DE | 10 2009 005 556 | 7/2010 |

OTHER PUBLICATIONS

Machine translation DE 10 2006 044 332. Aug. 14, 2013.*
Machine translation DE 10 2006 044 332_2. Aug. 14, 2013.*

* cited by examiner

*Primary Examiner* — Javaid Nasri
(74) *Attorney, Agent, or Firm* — Farjami & Farjami LLP

(57) ABSTRACT

There is provided a maritime current power plant park that includes a plurality of maritime current power plants, where each of the plurality of maritime current power plants has a rotor-like water turbine, an electric generator, and a drive train connecting the electric generator to the rotor-like water turbine. The drive train has bearing components for supporting the rotor-like water turbine. At least two of the plurality of maritime current power plants have differently dimensioned rotor-like water turbines, and the drive train of each of the at least two of the plurality of maritime current power plants is uniform.

20 Claims, 3 Drawing Sheets

MARITIME CURRENT POWER PLANT PARK AND A METHOD FOR ITS PRODUCTION

This is a U.S. application which is based on, and claims priority from foreign application Ser. No. 10 2011 101 365.6, filed May 12, 2011, in Germany.

FIELD OF THE INVENTION

The invention relates to a maritime current power plant park with maritime current power plants and a method for its production.

BACKGROUND

Maritime current power plants in form of free-standing units with rotor-like water turbines for generating power from a watercourse or a maritime current, especially a tidal current, are known. An arrangement without damming structures opens up numerous installation locations especially close to the coast for which barrages cannot be produced in an economically viable manner. Furthermore, the typically fully immersing units do not represent an obstruction to shipping and do not represent any danger for the fish stocks due to the low rotational speed of the rotor-like water turbines. The disadvantageous aspect in the design concept of free-standing maritime current power plants is the necessity that every single unit needs to be configured for rarely occurring peaks in the loading because it is not possible to use the possibility provided for barrages to remove individual water turbines from the flow by blocking the conduction of the water.

One possibility for regulating the speed of generic units is to rotatably fasten the rotor blades of the water turbine to a hub component. For the purpose of reducing the load in the event of strong inflow, the rotor blades can then be moved to the feathering pitch. This approach leads to a constructively complex attachment of the rotor blades however. It needs to be considered that the actuators and bearing components required for the adjustment of the rotor blades need to be arranged in a fail-proof manner because in the event of an erroneous position of the blades there is the likelihood of a loss of the rotor blade. Furthermore, a rotatable rotor blade fixing represents a component which requires high amount of maintenance especially for a location in the sea with respect to problems concerning corrosion and maritime growth, so that the constructively simple approach of a torsion-proof fixing of the rotor blades to a hub element is preferred.

For the purpose of securely configuring the unit, it is necessary to additionally consider the expected meteorological conditions in addition to the cycles of the driving flow. In the case of the tidal flow, the inflow caused by ebb-tide and flood-tide can be influenced by wind and wave motions. This relates especially to areas close to the surface. Furthermore, the contour of the seabed needs to be taken into account, with peak loads having to be expected depending on the current and weather conditions.

If several maritime current power plants are combined into a maritime current power plant park, it is advantageous for economic reasons to use identical units. This simplifies production and installation of the maritime current power plants. Furthermore, the interconnection to the grid and the maintenance of the units can be standardized and be performed with uniform maritime vehicles for salvaging. The inflow conditions will vary within a maritime current power plant park depending on the respective installation location, so that the uniform units need to be adjusted to the maximum load which may theoretically be expected in the part in total. Most units of a maritime current power plant park are consequently designed with an overdimensioned security reserve, so that this would lead to constructively complex maritime current power plants with reduced efficiency.

SUMMARY

The invention is based on the object of overcoming the aforementioned disadvantages of maritime current power plant parks, especially tidal power plant parks. A maritime current power plant park shall be understood as being a spatial grouping of maritime current power plants which typically comprise a common interconnection with the grid and/or a land connection in form of a sea cable. A maritime current power plant park shall be provided whose maritime current power plants are arranged in a constructively simple manner and which utilize the location-specific flow in an efficient manner over an annual average. Furthermore, the individual units of the maritime current power plant park shall be arranged with a security reserve which is adjusted to the respective location of the unit. Furthermore, a method for producing a maritime current power plant park shall be provided, wherein the individual maritime current power plants of the park are loaded evenly, so that the service life and the maintenance intervals will match one another.

The aforementioned object will be achieved by the features of the independent claims. The inventors have recognized that for a maritime current power plant park there should be a location-specific adjustment of the individual maritime current power plants on the basis of uniform drive trains and rotor-like water turbines which are chosen specifically for the location. As a result, every single maritime current power plant of the park will receive a rotor-like water turbine which is adjusted to the respectively expected flow conditions and the chosen uniform drive train. The inflow expected at the individual locations of the units will either be measured or estimated on the basis of a model.

The standardized drive train represents a connection between the rotor-like water turbine and an electric generator and simultaneously supports a rotor-like water turbine by means of associated bearing components, which water turbine is preferably arranged as a horizontal turbine. Radially and axially acting bearing components or combined bearings are provided on the drive train for the revolving unit, which typically comprises a drive shaft in addition to the rotor-like water turbine.

The choice of a drive train, especially the dimensioning of the associated bearing components, leads to a default value concerning a maximum thrust load in the axial direction and therefore along a rotational axis associated with the rotor-like water turbine. Furthermore, a maximum tilting moment about a transverse axis disposed perpendicularly to the rotational axis is predetermined by the choice of the drive train.

Based on a uniform drive train for the maritime current power plants of the maritime current power plant park, the rotor-like water turbines of the individual maritime current power plants are adjusted to the respective location of the unit. Accordingly, at least two maritime current power plants are provided in a spatial grouping of several units for a maritime current power plant park in accordance with the invention, which units comprise differently dimensioned rotor-like water turbines and similar drive trains. The location-specific adjustment of the rotor-like water turbine occurs by choosing different rotor diameters and/or a variation of the rotor blade profiles, e.g. by setting the depth distribution of the profile and/or the progression of the twist the rotor blades. For one embodiment, the rotor blade elasticity with respect to a torsion and/or blade deflection in the direction of flow will be adjusted alternatively or additionally to the location-specific adjustment, so that the rotor elasticity is used for reducing the rotor loads under maximum load conditions. The load reduction achieved thereby will be configured in a lower way at a unit allocation with a lower expected maximum load in comparison with a location with higher load peaks in order to improve the overall efficiency of the respective unit.

A load-limited operation of the units is simplified by the location-specific choice of the rotor characteristics provided for the individual units by taking into account uniform drive trains. A speed regulation of the units is produced by guiding the rotor-like water turbine into the rapid-speed range above a predetermined load threshold which is determined by the choice of the drive train. The braking torque acting by the electric generator on the drive train will be reduced to such an extent that the rotor-like water turbine is operated with a speed ratio above the speed ratio at optimal performance or a speed ratio which is required for power reduction with a load-limited speed ratio. The rotor-like water turbine can be guided in the limit up to the runaway speed. Accordingly, the location-specific rotor configuration is preferably provided by predetermining a runaway speed ratio.

The choice of identical drive trains for producing a maritime current power plant park in conjunction with a location-specific adjustment of the rotor-like water turbine leads to corresponding load limits for the load-absorbing structures which are adjacent to the drive train, especially its bearing components. This leads to a uniform nacelle housing which encloses the standardized drive train with the electric generator which is connected thereto. Identical components are used for all units of the maritime current power plant park, preferably for the electrical machine components, especially the electric generator, and the frequency converters which are used for interconnection to the grid. A standardized tower adapter is preferably connected to the nacelle housing for two-part units for which the nacelle housing can be placed on a support structure with which the unit rests on the seabed.

The immersion depth of the units is further chosen in addition to the adjustment of the rotor characteristics. If vertices are associated to the rotor circles of the rotor-like water turbines, they are disposed at the same mean immersion depth according to a preferred embodiment which is predetermined for example by shipping requirements. As a result of a location-specific adjustment in the dimensioning of the rotor-like water turbines, the maritime current power plants will have rotational axes within the maritime current power plant park which are disposed at different immersion depths. As a result, the height of the support structure over the seabed is determined in this way, so that for an advantageous further development the foundation can be adjusted on the seabed in a location-specific manner. This relates especially to configurations of units with a gravity foundation.

The location-specific adjustment of the rotor-like water turbine for every single maritime current power plant of a park based on identical drive trains can be used by different types of units. Horizontal turbines arranged in this manner are provided in an especially preferred manner with rotor blades which are linked in a torsion-proof manner. In the case of tidal power plants, the profiles of the rotor blades can be arranged in a symmetrical manner in order to enable bidirectional operation of the units. Alternatively, the adjustment of the units in response to a change in the direction of flow occurs by an azimuth rotational mechanism for adjusting the rotor-like water turbine. It is further possible for implementing the invention to use a unit with rotor blades which are rotatably fixed to a hub part. In the case of tidal power plants, rotor blades are advantageous in such an embodiment which can be rotated by at least 180°. Furthermore, the rotor-like water turbine can be enclosed by a flow housing which is arranged as a Venturi housing for accelerating the flow.

The invention will be explained in closer detail below by reference to embodiments and illustrations in the drawings in which the following is shown in detail:

DETAILED DESCRIPTION

Figure 1:
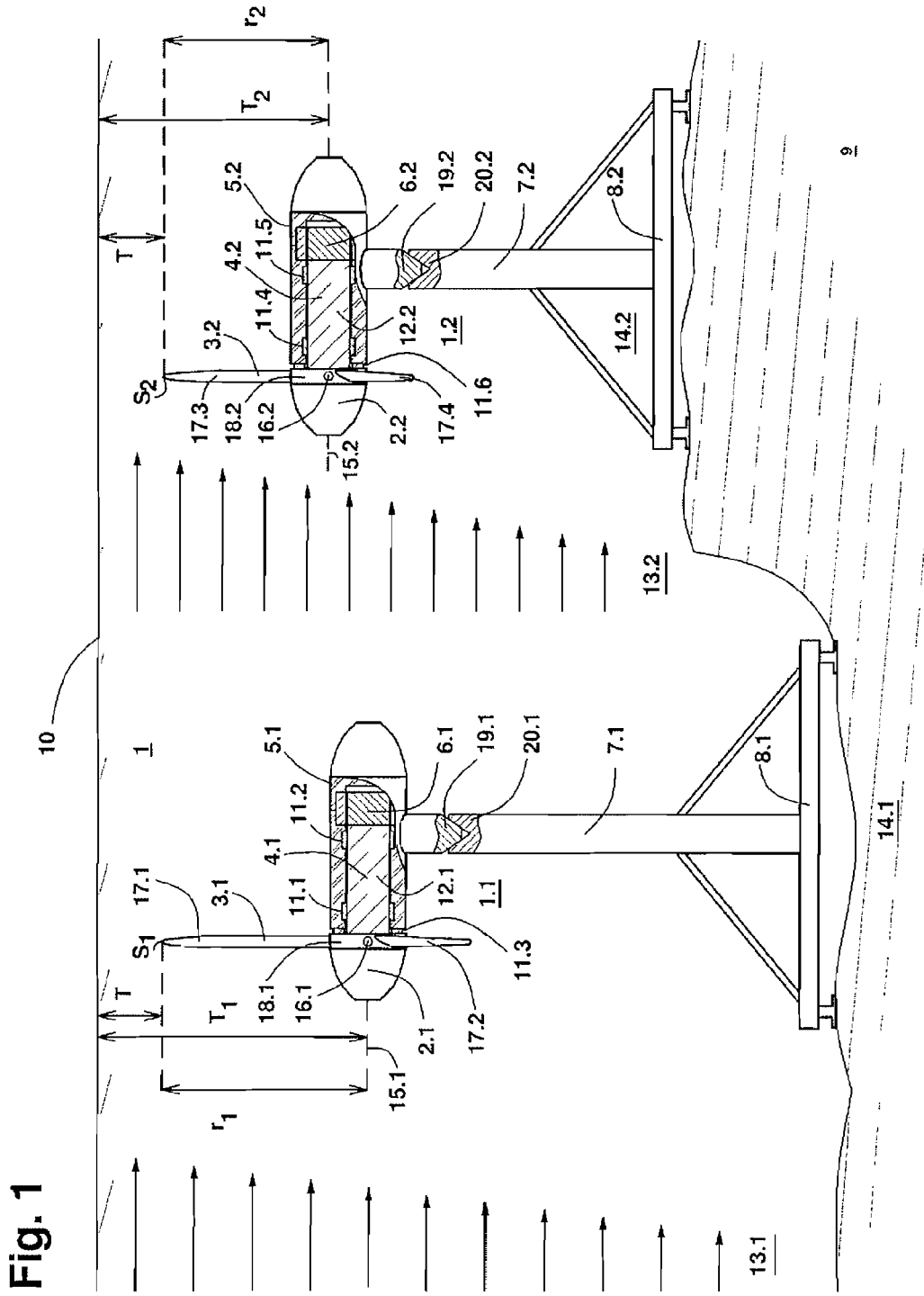
FIG. 1 shows two exemplary maritime current power plants of a maritime current power plant park in accordance with the invention in a partly sectional side view.

FIG. 1 shows two maritime current power plants 1.1, 1.2 by way of example for a maritime current power plant park 1 at a first unit location 14.1 to which a first flow field 13.1 is associated and at a second unit location 14.2 with a second flow field 13.2 which deviates from the first flow field 13.1. The starting point for producing the maritime current power plants 1.1, 1.2 is a drive train 4.1, 4.2 which is uniform for both units. It comprises bearing components 11.1 to 11.6 for axial and radial support of a revolving unit 2.1, 2.2. The revolving unit 2.1, 2.2 comprises a drive shaft 12.1, 12.2 which produces a connection between a hub 18.1, 18.2 on the rotor side and the electric generator 6.1, 6.2. In the present case, there is a direct coupling with a torsion-proof connection.

There is a weaker first flow field 13.1 at the first unit location 14.1. Accordingly, the first rotor-like water turbine 3.1 of the maritime current power plant 1.1 is adjusted in a location-specific manner and comprises a first rotor radius $r_1$ which is larger than the second rotor radius $r_2$ of the second rotor-like water turbine 3.2 for the maritime current power plant 1.2 at the second unit location 14.2.

The standardized drive train 4.1, 4.2 leads to a default value for the maximum thrust load along the rotational axis 15.1, 15.2 of the revolving unit 2.1, 2.2. A further default value is obtained for the maximum tilting moment about a transverse axis 16.1, 16.2 which is disposed perpendicularly to the rotational axis 15.1, 15.2 and perpendicularly to the vertical direction. A tilting moment about the transverse axis 16.1, 16.2 is obtained as a result of the profile of the flow fields 13.1, 13.2 which act upon the water turbines 3.1, 3.2. The location-specific adjustment of the first rotor-like water turbine 3.1 and the second rotor-like water turbine 3.2 follows from the default values for the maximum thrust load and for the maximum tilting moment.

The unification of the drive train 4.1, 4.2 allows using identical machine nacelles 5.1, 5.2 and identical electric generator 6.1, 6.2. Furthermore, the illustrated preferred embodiment of the tower adapter 19.1, 19.2 is also arranged as a standard part, with which the unit can be placed on a complementary shaped coupling apparatus 20.1, 20.2 on the support structure 7.1, 7.2. This configuration which is identical for all units in the maritime current power plant park 1 is obtained from the adaptation of the thrust loads and tilting moment present during strong inflow which is the result of the location-specific adjustment of the rotor-like water turbines 3.1, 3.2. For the embodiment as shown in FIG. 1, the vertices $S_1$, $S_2$ of the rotor circles of the first rotor-like water turbine 3.1 and the second rotor-like water turbine 3.2 are situated at a corresponding immersion depth T. It is chosen in such a way that the units are protected from damage caused by maritime vehicles and in addition the water turbines 3.1, 3.2 will be immersed in a sufficiently deep way in order to prevent cavitation effects during operation. As a result, the rotational axes 15.1, 15.2 of the maritime current power plants 1.1, 1.2 are situated at different immersion depths $T_1$ and $T_2$. The support structure 7.1, 7.2 which reaches up to a foundation 8.1, 8.2 on the seabed 9 will be adjusted accordingly. It is furthermore also possible to adjust the foundation 8.1, 8.2 itself to the respective unit location 14.1, 14.2 and the height of the support structure 7.1, 7.2.

Figure 2:
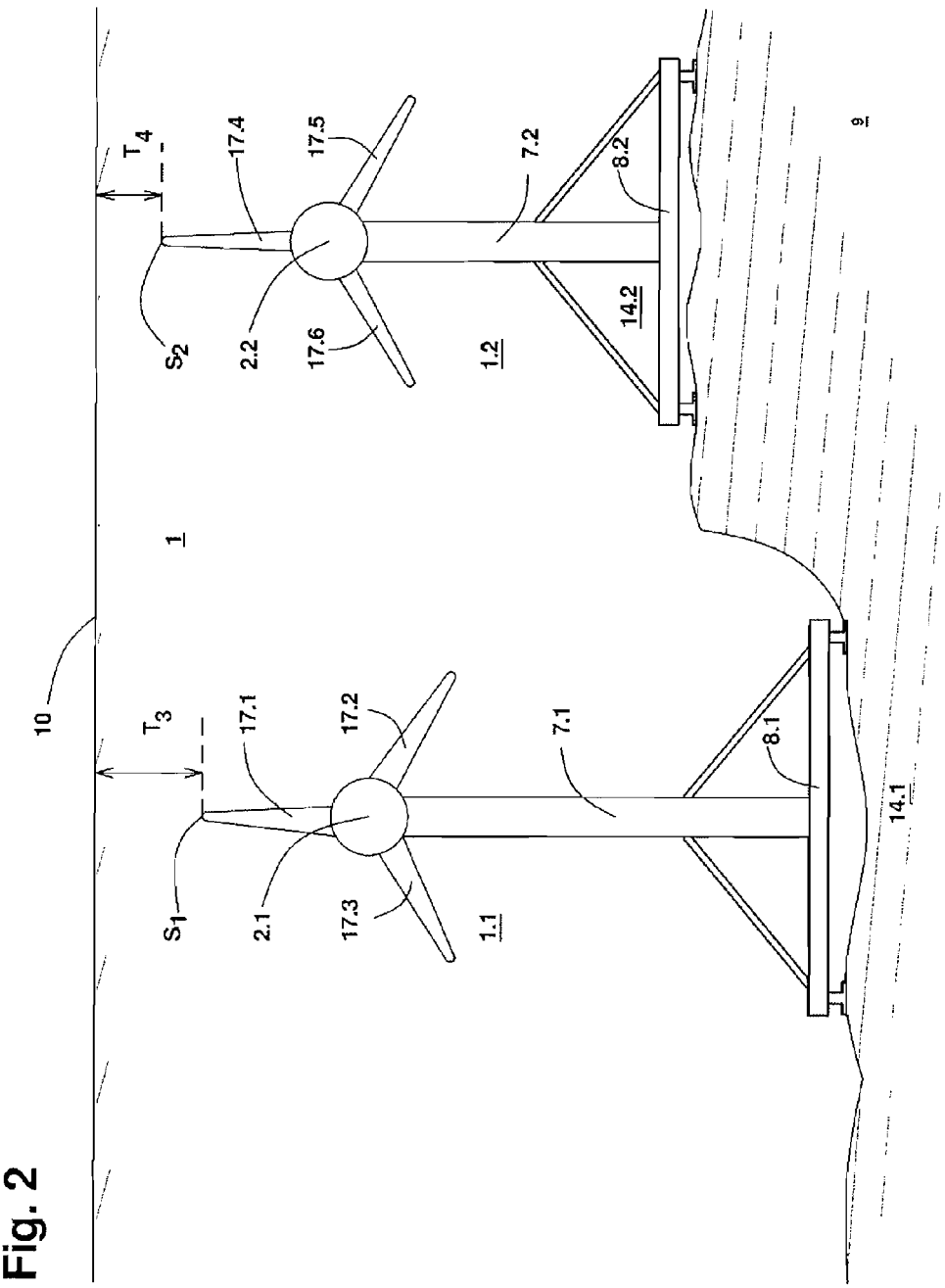
FIG. 2 shows an alternative embodiment for a maritime current power plant park in accordance with the invention.

FIG. 2 shows an alternative embodiment of a tidal current power plant park 1 with the tidal power plants 1.1, 1.2. Units are shown whose vertices $S_1$, $S_2$ of the rotor circles are disposed at different immersion depths $T_3$, $T_4$. There are uniform drive trains, which are not shown in detail. The illustration shows the rotor-like water turbines 3.1, 3.2 which are adjusted to the respective unit locations 14.1, 14.2 and whose rotor blade profiles have been chosen differently in order to maintain the loading thresholds for the thrust load and the tilting moment which are predetermined by the drive train.

Figure 3:
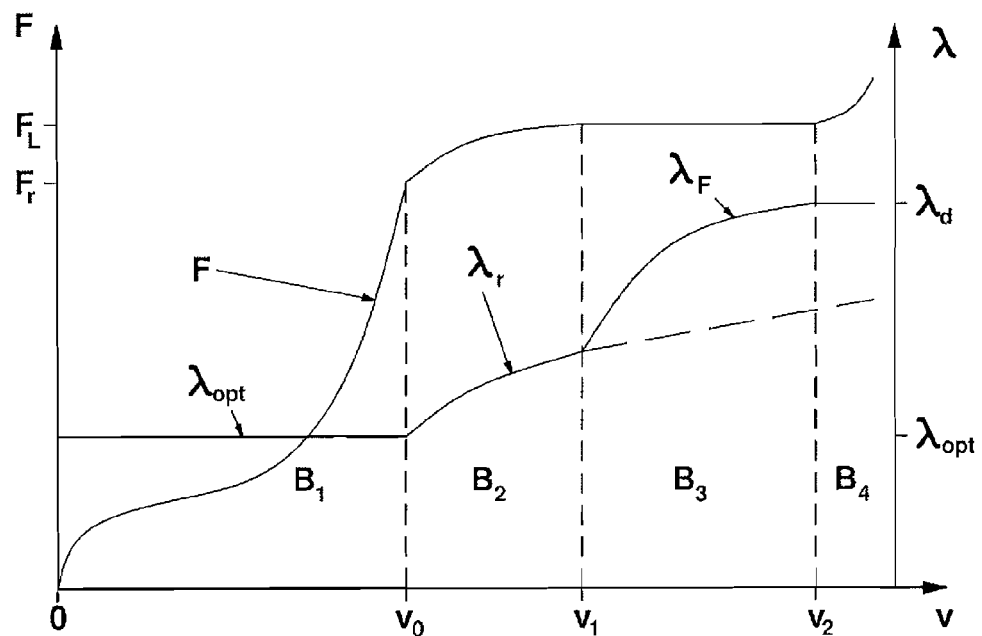
FIG. 3 shows the load-limited unit operation for a maritime current power plant park in accordance with the invention.

FIG. 3 shows the arrangement of a load-limited operation which forms the basis for adjusting the rotor-like water turbine to a location-specific inflow and the loading capacity of a standardized drive train. The speed ratio $\lambda$ is shown, which is determined as the ratio between the blade tip speed of the rotor-like water turbine and an averaged inflow velocity v, with the inflow velocity v following from an averaging of the flow field over the rotor circle. The illustration further shows the thrust F against the averaged inflow velocity v. Power-optimized operation $B_1$ is performed at power-optimized speed ratio $\lambda_{opt}$ for averaged inflow velocities up to $v_0$. Once the thrust F reaches the nominal thrust $F_r$, the unit will move to the power-limited operation $B_2$. Guidance along the curve for the power-limited speed ratio $\lambda_r$ occurs for this purpose. As a result, the thrust F will also rise up to a predetermined threshold value $F_L$ for the thrust, from which the transition to the thrust-limited operation $B_3$ is performed. The rotor-like water turbine is further accelerated for this purpose and guided along the thrust-limited speed ratio $\lambda_F$. This thrust-limited operation $B_3$ will be performed in the range of the averaged inflow velocities $v_1$ and $v_2$. When reaching the runaway speed, which is associated with the speed ratio $\lambda_d$, the thrust load F on the rotor will increase with an increasing averaged inflow velocity v. That is why the rotor-like water turbine needs to be configured in such a way that this range $B_4$ will not be reached even under maximum load. Respective configuration criteria are obtained for the tilting load not shown in detail in FIG. 3.

Further embodiments are possible within the scope of the following claims. The location-specific adjustment of the rotor-like water turbine on the basis of a standardized drive train can also be used for units with a vertical rotational axis in addition to horizontal turbines.

LIST OF REFERENCE NUMERALS

1 Maritime current power plant park
1.1 First maritime current power plant
1.2 Second maritime current power plant
2.1, 2.2 Revolving unit
3.1 First rotor-like water turbine
3.2 Second rotor-like water turbine
4.1 First drive train
4.2 Second drive train
5.1, 5.2 Machine nacelle
6.1, 6.2 Electric generator
7.1, 7.2 Support structure
8.1, 8.2 Foundation
9 Seabed
10 Water surface
11.1, . . . 11.6 Bearing components
12.1, 12.2 Drive shaft
13.1 First flow field
13.2 Second flow field
14.1 First unit location
14.2 Second unit location
15.1, 15.2 Rotational axis
16.1, 16.2 Transverse axis
17.1, 17.2, 17.3, 17.4 Rotor blade
18.1, 18.2 Hub
19.1, 19.2 Tower adapter
20.1, 20.2 Coupling apparatus
$r_1$ First rotor radius
$r_2$ Second rotor radius
$S_1$, $S_2$ Vertex of the rotor circle
$T_1$, $T_2$, $T_3$, $T_4$ Immersion depth
$\lambda$ Speed ratio
$\lambda_d$ Speed ratio associated with runaway speed
$\lambda_{opt}$ Power-optimized speed ratio
$\lambda_r$ Power-limited speed ratio
$\lambda_F$ Thrust-limited speed ratio
F Thrust
$F_r$ Nominal thrust
$F_L$ Threshold value for the thrust
v, $v_0$ . . .
$v_1$, $v_2$ Averaged inflow velocity
$v_n$ Nominal inflow velocity
$B_1$ Power-optimized operation
$B_2$ Power-limited operation
$B_3$ Thrust-limited operation
$B_4$ Operation at runaway speed

The invention claimed is:

1. A maritime current power plant park comprising:
a plurality of maritime current power plants, each of the plurality of maritime current power plants including:
a rotor-like water turbine;
an electric generator; and
a drive train connecting the electric generator to the rotor-like water turbine, the drive train comprising bearing components for supporting the rotor-like water turbine;
wherein at least two of the plurality of maritime current power plants comprise differently dimensioned rotor-like water turbines, and wherein the drive train of each of the at least two of the plurality of maritime current power plants is uniform.

2. The maritime current power plant park according to claim 1, wherein the differently dimensioned rotor-like water turbines have rotor diameters which deviate from one another.

3. The maritime current power plant park according to claim 2, wherein the differently dimensioned rotor-like water turbines have profile configurations which deviate from one another.

4. The maritime current power plant park according to claim 3, wherein the maritime current power plants of the maritime current power plant park have same electric generators.

5. The maritime current power plant park according to claim 3, wherein the rotor-like water turbines are associated with rotor circles having vertices, wherein the vertices are disposed at a same immersion depth.

6. The maritime current power plant park according to claim 2, wherein the maritime current power plants of the maritime current power plant park have same electric generators.

7. The maritime current power plant park according to claim 6, wherein the rotor-like water turbines are associated with rotor circles having vertices, wherein the vertices are disposed at a same immersion depth.

8. The maritime current power plant park according to claim 2, wherein the rotor-like water turbines are associated with rotor circles having vertices, wherein the vertices are disposed at a same immersion depth.

9. The maritime current power plant park according to claim 1, wherein the differently dimensioned rotor-like water turbines have profile configurations which deviate from one another.

10. The maritime current power plant park according to claim 9, wherein the maritime current power plants of the maritime current power plant park have same electric generators.

11. The maritime current power plant park according to claim 9, wherein the rotor-like water turbines are associated with rotor circles having vertices, wherein the vertices are disposed at a same immersion depth.

12. The maritime current power plant park according to claim 1, wherein the maritime current power plants of the maritime current power plant park have same electric generators.

13. The maritime current power plant park according to claim 12, wherein the rotor-like water turbines are associated with rotor circles having vertices, wherein the vertices are disposed at a same immersion depth.

14. The maritime current power plant park according to claim 1, wherein the rotor-like water turbines are associated with rotor circles having vertices, wherein the vertices are disposed at a same immersion depth.

15. The maritime current power plant park according to claim 1, wherein at least two maritime current power plants have rotational axes which are disposed at different immersion depths.

16. The maritime current power plant park according to claim 1, wherein the rotor-like water turbines of the maritime current power plants comprise rotor blades which are fixed in a torsion-proof manner to a hub.

17. A method for producing a maritime current power plant park having a plurality of maritime current power plants, wherein each of the plurality of maritime current power plants comprises a rotor-like water turbine, an electric generator, and a uniform drive train connecting the electric generator to the rotor-like water turbine, wherein the drive train comprises bearing components for supporting the rotor-like water turbine, the method comprising:

adjusting the rotor-like water turbine of each of the plurality of maritime current power plants according to a location of each corresponding maritime current power plant of the plurality of maritime current power plants.

18. The method according to claim 17, wherein the rotor-like water turbine is associated with a rotational axis and the adjusting of the rotor-like water turbine is performed using a default value for a maximum thrust load along the rotational axis.

19. The method according to claim 17, wherein the rotor-like water turbine is associated with a transverse axis which extends perpendicularly to the rotational axis and the adjusting of the rotor-like water turbine is made on the basis of a default value for a maximum tilting moment about the transverse axis.

20. The method according to claim 17, wherein the adjusting of the rotor-like water turbine is made by the default value of a runaway speed ratio $\lambda_d$.

* * * * *